US012778032B2

(12) United States Patent
Witasek et al.

(10) Patent No.: US 12,778,032 B2
(45) Date of Patent: Nov. 3, 2026

(54) PLANT PROTECTOR

(71) Applicants: WITASEK Pflanzenschutz GmbH, Feldkirchen (AT); FunderMax GmbH, St. Veit an der Glan (AT)

(72) Inventors: Peter Witasek, Feldkirchen (AT); Michael Seebacher, St. Veit an der Glan (AT); Günter Reichmann, St. Veit an der Glan (AT)

(73) Assignees: WITASEK PFLANZENSCHUTZ GMBH, Feldkirchen (AT); FUNDERMAX GMBH, St. Veit an der Glan (AT)

( * ) Notice: Subject to any disclaimer, the term of this patent is extended or adjusted under 35 U.S.C. 154(b) by 133 days.

(21) Appl. No.: 18/298,103

(22) Filed: Apr. 10, 2023

(65) Prior Publication Data

US 2023/0320283 A1 Oct. 12, 2023

(30) Foreign Application Priority Data

Apr. 12, 2022 (AT) .............................. A 50235/2022

(51) Int. Cl.
*A01G 13/28* (2025.01)

(52) U.S. Cl.
CPC .................................. *A01G 13/28* (2025.01)

(58) Field of Classification Search
CPC ...... A01G 13/00; A01G 13/10; A01G 13/105; A01G 13/27; A01G 13/28
See application file for complete search history.

(56) References Cited

U.S. PATENT DOCUMENTS

| | | | | |
|---|---|---|---|---|
| 3,772,968 A * | 11/1973 | Ruda | B65D 33/28 | 493/224 |
| 5,471,783 A * | 12/1995 | McLean | A01G 13/28 | 229/4.5 |
| 5,544,446 A * | 8/1996 | Benson, Jr. | A01G 13/10 | 220/6 |

(Continued)

FOREIGN PATENT DOCUMENTS

| | | |
|---|---|---|
| AT | 005 520 | 8/2002 |
| AT | 11447 | 11/2010 |

(Continued)

OTHER PUBLICATIONS

Austrian Search Report for A 50235/2022, dated Feb. 3, 2023, 1 page.

(Continued)

*Primary Examiner* — Magdalena Topolski
*Assistant Examiner* — Katherine Anne Kloecker
(74) *Attorney, Agent, or Firm* — NIXON & VANDERHYE

(57) ABSTRACT

A plant protector includes four wall parts, which are connected to one another to form a tube shaped like the jacket of a prism. In this case, the wall parts are connected to one another up to one edge of the plant protector, so that the wall parts can pivot relative to one another in order to form the tube. The edges of the wall parts initially not connected to one another and adjoining the other edge of the plant protector are connected to one another using plug-in connections. The wall parts and the other components of the plant protector can consist of pressed wood fibers and/or wood shavings.

13 Claims, 11 Drawing Sheets

(56) References Cited

U.S. PATENT DOCUMENTS

| | | | | | |
|---|---|---|---|---|---|
| 5,809,690 | A * | 9/1998 | Due | A01G 13/28 47/30 |
| 6,088,952 | A * | 7/2000 | Wilson | A01G 13/10 47/30 |
| 6,557,711 | B2 * | 5/2003 | Grueneberg | A47F 5/112 211/119.003 |
| 8,220,199 | B2 * | 7/2012 | Thomas | A01G 29/00 47/48.5 |
| 9,149,009 | B2 * | 10/2015 | Edgington | A01G 17/12 |
| D854,386 | S * | 7/2019 | Bottari | A01G 13/105 D8/1 |
| 11,457,572 | B2 * | 10/2022 | Battoe | A01G 13/26 |
| 2018/0084739 | A1 | 3/2018 | Bottari | |
| 2020/0359575 | A1 * | 11/2020 | Wilson | A01G 13/31 |
| 2023/0240206 | A1 * | 8/2023 | Hurlstone | A01G 13/28 47/32.4 |

FOREIGN PATENT DOCUMENTS

| | | | | |
|---|---|---|---|---|
| AT | 12496 U1 | | 6/2012 | |
| AT | 13424 | | 12/2013 | |
| AT | 13572 | | 3/2014 | |
| AT | 16701 | | 7/2020 | |
| AT | 523044 | | 5/2021 | |
| AU | 2021103547 A4 | * | 8/2021 | A01G 13/23 |
| DE | 10 2007 030 888 | | 1/2008 | |
| DE | 102009003164 A1 | | 11/2010 | |
| DE | 20 2013 100 596 | | 2/2013 | |
| DE | 202013100950 U1 | | 3/2013 | |
| EP | 0 230 767 | | 8/1987 | |
| EP | 2245920 A1 | | 11/2010 | |
| EP | 2 324 699 | | 5/2011 | |
| EP | 2 368 422 | | 9/2011 | |
| EP | 2 476 306 | | 7/2012 | |
| EP | 2 532 225 | | 12/2012 | |
| EP | 2532225 A1 | * | 12/2012 | A01G 13/0243 |
| EP | 3 146 835 | | 3/2017 | |
| EP | 3146835 A1 | * | 3/2017 | A01G 13/0243 |
| EP | 3 788 869 | | 3/2021 | |
| ES | 2582356 A1 | | 9/2016 | |
| GB | 2104366 A | | 3/1983 | |
| GB | 2261584 A | * | 5/1993 | A01G 13/0243 |
| GB | 2 290 691 | | 1/1996 | |
| GB | 2326578 A | * | 12/1998 | A01G 9/026 |
| GB | 2 442 333 | | 4/2008 | |
| WO | 2020/225402 | | 11/2020 | |

OTHER PUBLICATIONS

Search Report issued in European Patent Application No. 23166089.5 dated Oct. 20, 2023.

* cited by examiner

PLANT PROTECTOR

CROSS-REFERENCE TO RELATED APPLICATIONS

This application claims the priority under 35 USC 119(a) of Austrian patent application A 50235/2022 filed on Apr. 12, 2022, the entirety of which is incorporated herein by reference.

BACKGROUND OF THE INVENTION

Field of the Invention

The invention relates to a plant protector.

Description of the Related Art

A plant protector in the form of plant protective covers or tubes is known in various embodiments.

Plant protective covers with an essentially square cross-sectional shape are known from AT 005 520 U1, AT 11 447 U1, AT 13 572 U1, EP 2 532 225 A1 (=AT 12 562 U1), EP 2 324 699 A1 (=AT 1 447 U1), or DE 10 2007 030 888 U1. Holes are also provided in the known plant protective covers.

Plant protective covers in the form of closed tubes made of plastic with an essentially circular cross-sectional shape are known from, for example, GB 2 442 333 A1 or EP 2 368 422 A2 (=AT 11 667 U1). Also, the round plant protective covers have holes.

A plant protective cover that consists of a plastic blank that can be closed to form a tube with an essentially square cross-sectional shape is known from AT 13 424 U1.

Another plant protective cover is known from AT 16 701 U2.

These known plant protective covers consist primarily of plastic, for example in the form of twin-wall sheets.

Plant protective covers that consist of cardboard are also known. In the case of protective covers that are environmentally friendly per se and consist of cardboard, it is disadvantageous that these protective covers soften and disintegrate under the action of wet conditions (rain, dew, or snow melt), so that the protective action is then lost.

EP 2 476 306 A2 shows and describes a plant protective cover that consists of cardboard layers that are wound in the form of helical lines and that are connected to one another with a special adhesive ("penetrating paper converting adhesive"). Layers of the cardboard can be impregnated with a biocide. It is mentioned that the protective cover can be treated with wax or acrylic in order to make it weatherproof.

GB 2 290 691 A discloses a plant protective cover made of at least two cardboard layers that are wound in the form of helical lines, wherein at least one of the layers was treated in order to improve the wet strength and the water resistance.

According to EP 3 146 835 A1, a biodegradable growth protector is to consist entirely of completely biodegradable material and can have openings. As material for the protector, a compostable plastic compound made of Ecoflex plastic and polylactic acid is mentioned. It is proposed that the protective cover consist of a combination of various materials. In this case, it is mentioned that the growth protector can alternatively be made of cardboard material.

Known from AT 523 044 B1 is a protective cover that is intended to be a plant protective cover and comprises at least one cardboard layer and at least one bioplastic layer at least on its exterior. The cardboard layer can be a cardboard strip in the form of helical lines, so that the protective cover is a wrapped tube. In this case, free spaces forming openings are provided between the individual windings of the cardboard strip, which free spaces are overlapped by the at least one plastic layer arranged on the exterior of the protective cover.

US 2018/0084739 A1 shows a plant protector that consists of two or more than two wall parts, wherein the wall parts are rectangular and curved and are connected to one another via at least one flexible joint. Frictionally-engaged plug-in connections are provided for closing the tubes. Biodegradable materials are also mentioned for the known plant protector. Plastic (polypropylene) is mentioned as a preferred material. A plant rod is arranged in the interior of the plant protector, wherein the plant protector is easily inserted over the plant rod. Any measures to secure the plant protector to the plant rod are not provided.

DE 20 2013 100 596 U1 discloses a plant protective cover made of plastic, which is formed from a one-piece blank. Plug-in connections comprising straps and holes are provided for closing the blank to form a tube. The blank is to be angled along the edges of the tube. The four wall parts are rectangular and flat.

A growth protector made of translucent corrugated cardboard, which consists of a blank, is shown and described in EP 3 788 869 A1. The wall parts are flat and essentially rectangular and either flat or curved. The blank is closed to form a tube by gluing overlapping ends or by other means. The known growth protector has holding devices for a plant rod formed by invaginations. The material of the growth protector is to be environmentally compatible.

EP 0 230 767 A1 discloses a protective cover made of extruded polypropylene in the form of a multi-sided prism. The wall parts are flat and rectangular. The cover is closed by two terminal wall parts that overlap and are secured on top of each other. The safety device can comprise caps that are inserted through openings and are secured with a cord. Also, a safety device in the form of a plastic cord (depending on the type of cable tie) is shown. The safety device can also be used to secure the protective cover to an outside or inside rod.

WO 2020/225402 A1 discloses a plant protector in the form of a tube (cylindrical or prismatic), which can consist of two wall parts. As a material for the plant protector, i.a., wood chips, sawdust with binding agents are mentioned. (Bottom of page 1 to top of page 2).

In the case of the known covers or tubes used as plant protectors, it is disadvantageous that the latter still require plastic and are often less stable, so that the known plant protector can be easily damaged by the effects of weather and/or animals. This often has the effect that the plant protector can no longer achieve its assigned task and, moreover, is often vulnerable to air movements.

SUMMARY OF THE INVENTION

The object of the invention is to make available a plant protector that does not have the described drawbacks and nevertheless deploys a good protective action, is easy to handle, and is not expensive.

This object is achieved with a plant protector that has the features disclosed and claimed.

Preferred and advantageous embodiments of the plant protector according to the invention are also disclosed and claimed.

Since the plant protector according to the invention comprises plate-like wall parts, which are connected to one another to form the tube of the plant protector, the wall parts can be stable and are easily assembled to form the desired shape of the tube of the plant protector.

In this case, the invention is not limited to a specific material of the plate-like wall parts and other components of the plant protector according to the invention, although a good environmentally-compatible material is preferred as material. For example, the material is a material based on natural fibers, such as plant fibers, wood fibers, and/or wood shavings, wherein the wall parts and preferably also the other components of the plant protector according to the invention consist of natural fibers that are pressed with or without added binding agents, such as wood fibers and/or wood shavings that are pressed with or without binding agents.

When the natural fibers, such as wood fibers and/or wood shavings with an added binding agent, are pressed, a binding agent that is biologically harmless and in particular is biodegradable is preferably used.

Examples of binding agents that can be used within the framework of the invention are urea resins, melamine resins, phenol resins, or resorcinol resins.

Examples of binding agents that can preferably be used within the framework of the invention are solvent-free binding agents, which are biologically harmless in the hardened state, for example polyurethane or epoxide resins.

Examples of biodegradable binding agents that can be used within the framework of the invention are animal glue, starch-based glue, and protein-based glue, such as casein glue.

Within the framework of the invention, it is preferred to press natural fibers, such as wood fibers and/or wood shavings, free of binding agents, to form plate-like wall parts and other components of the plant protector according to the invention.

Preferably defined by the term “wood fibers” that is used here are: shavings (normal shavings) with a length of 5 to 10 mm and a thickness of 0.2 to 0.3 mm; superfine shavings with a length of 3 to 6 mm and with a thickness of 0.1 to 0.25 mm; slightly frayed fiber shavings with a length of 1 to 6 mm and with a thickness of 0.1 to 0.25 mm; heavily frayed fiber shavings with a length of 1 to 6 mm and with a thickness of 0.08 to 0.2 mm; as well as abrasive wood dust with dimensions of 0.4 to 0.6 mm.

For example, the plate-like wall parts and additional components of the plant protector according to the invention contain softwood fibers, for example spruce fibers, with a length of 3 to 6 mm, and/or hardwood fibers, for example beech or oak fibers, with a length of 1 to 1.5 mm.

Within the framework of the invention, consideration is also given to mixtures made of at least two of the above-mentioned types of natural fibers.

For example, the plate-like wall parts and preferably additional components of the plant protector according to the invention contain—in addition to softwood fibers, such as spruce fibers—up to 50% by weight of hardwood fibers, such as beech or oak fibers.

In an exemplary embodiment of the plant protector according to the invention, the plate-like wall parts and preferably additional components of the plant protector according to the invention contain 33% by weight (one-third) of hardwood fibers (for example, beech or oak) and 67% by weight (two-thirds) of softwood fibers (for example spruce).

The plate-like wall parts made of natural fibers, such as wood fibers and/or wood shavings that are pressed with or without added binding agents, preferably taken into consideration within the framework of the invention, can have a wall thickness (=thickness) of 1.0 to 5.0 mm, preferably 2.0 mm.

The material of the plate-like wall parts made of natural fibers, such as wood fibers and/or wood shavings that are pressed with or without added binding agents, can have a bulk density of 450.0 to 1,200.0 kg/m$^3$, preferably in the range of 950 kg/m$^3$.

These material properties preferably also apply for the other components of the plant protector according to the invention.

Connecting wall parts to a plant protector in the form of a tube can be done, for example, by using adhesive strips, in particular adhesive strips made of paper; textile tapes, such as tissue tapes or felt tapes, fastened—for example attached, glued, or stapled—to the edges of adjoining wall parts; seams, such as zig-zag seams; or metal clips in combination with at least one closable connection, such as a plug-in connection.

The above-mentioned options to connect wall parts of the plant protector according to the invention to one another by textile tapes, seams, metal clips, or adhesive strips produce a flexible connection of adjoining wall parts, even when the wall parts directly adjoin one another when connecting with their edges. This has the advantageous effect that wall parts that are connected to one another can be deformed by bending in the area of adjoining edges of wall parts to form a tube and that the tube can be closed by connecting the terminal edges.

It is preferred within the framework of the invention that adjoining edges of the plate-like wall parts with the exception of one pair of adjoining edges of the plate-like wall parts be connected to one another using the above-mentioned connecting agents (adhesive tapes, textile tapes, seams, or metal clips). The edges of the wall parts that are still not connected to one another can be connected to one another in any manner, in particular by at least one plug-in connection.

This embodiment makes it possible to connect—for example four—wall parts to one another, as described above, to form into a tube the wall parts that are thus connected to one another, and to close the tube.

It is preferably taken into consideration that for connecting pairs of adjoining edges of the plate-like wall parts with the exception of one pair of adjoining edges of the plate-like wall parts, adhesive strips, textile tapes, seams, or metal clips are used. The edges of the wall parts that are not connected to one another can be connected to one another for example and preferably using at least one plug-in connection.

This embodiment makes it possible to connect—for example four—wall parts to one another by three textile tapes, seams, adhesive strips (e.g., made of paper), or with metal clips. The wall parts that are thus connected to one another are deformed (bent) by bending along the edges of the wall parts to form a tube, which surrounds the plants that are to be protected. Then, the tube is closed using the plug-in connection(s) to form a four-sided prism that surrounds the plants to be protected.

The same applies for a plant protector in the form of a three-sided prism, which comprises three wall parts.

Within the framework of the invention, consideration is also given to an embodiment of the plant protector, in which all adjoining edges of wall parts are connected by adhesive strips, textile tapes, seams, or metal clips, so that the plant protector according to the invention is present from the outset in the form of a closed tube.

Within the framework of the invention, consideration is also given to an embodiment of the plant protector in which all adjoining edges of wall parts are connected by closable connections, such as plug-in connections. In this embodiment, the plant protector is attached, for example around the plant to be protected (for example, a tree), by the wall parts on site with one another being connected to one another, for example by plug-in connections.

At least one rod holding device ("plug holding device") can be provided on the plant protector according to the invention. With this rod holding device, the plant protector according to the invention can be secured against entrainment by the wind by the plant protector being inserted via a rod or stick anchored in the bottom, e.g., rammed into the bottom.

When the rod holding device, as provided in an embodiment of the invention, is formed by a strip that is connected to adjoining wall parts, the advantage results that in addition, the shape of the tube is maintained. This applies, for example, for tubes of the plant protector according to the invention made of four or more than four wall parts.

Components of the plant protector according to the invention, such as plate-like wall parts and rod holding devices, can be provided in the form of a plate, wherein the detaching of parts of the plant protector from the plate is facilitated by (for example punched) scoring lines.

For example, when producing the plant protector according to the invention, it is possible to proceed described as follows:

Plates (large-format plates) made of natural fibers are produced by natural fibers with or without added binding agents optionally being pressed to form plates in the presence of moisture.

The large-format plates are cut to the finished size in limited-lot manufacturing and placed by hand in a CNC machine. In the CNC machine, for example, in one pass, 10-piece, large-format plates are processed in batches. In this connection, all required recesses, millings, and perforations are made. Subsequently, the individual plant protective blanks (wall parts, etc.) are divided with a (sliding table) saw into threes or fours on the longitudinal side (depending on whether the shape of the plant protector is triangular or rectangular). In the following step, a paper adhesive tape (or another connecting agent, such as, e.g., metal clips) is applied along the saw kerf. Ultimately, the finished, assembled, but still open plant protector is stacked onto a pallet.

In batch production, the large-format plate is also cut to the finished size. Then, the large-format plate that forms a blank is transported in a die, the recesses and perforations are punched out, and at the same time, the "saw kerfs" are punched. The thus prepared plates are transported to a robot, where at least one paper adhesive tape or another means (textile tape, seam, metal clips) is applied for connecting the wall parts. The finished, but still open plant protector is automatically stacked and made ready for shipment.

The plant protector according to the invention consists of multiple, for example three or four, wall parts. The wall parts are connected to one another by a connection, such as a plug-in connection, in the area of an edge of the tube of the plant protector. In the area of the other, for example three or two, edges of the tube of the plant protector, the wall parts are connected to one another to be able to pivot relative to one another, for example using adhesive strips, textile tapes, seams, or metal clips. This embodiment of the plant protector according to the invention makes it possible to connect three or four wall parts to one another, to deform the thus obtained body relative to the tube of the plant protector, and then to connect the free edges of the terminal wall parts to one another to close the tube of the plant protector, for example by at least one plug-in connection.

Because of the (positive) connection that is provided in the area of at least one edge, such as a plug-in connection, the tube of the plant protector is made stable enough for use, although the wall parts in the area of the other edges of the tube of the plant protector are connected to one another in a movable manner.

In an exemplary embodiment, the plant protector according to the invention can be characterized in that the wall parts have an essentially rectangular shape.

In an exemplary embodiment, the plant protector according to the invention can be characterized in that at least one of the wall parts is flat.

In an exemplary embodiment, the plant protector according to the invention can be characterized in that at least one of the wall parts is curved, wherein the axis of the curvature runs in the interior of the tube and parallel to the longitudinal extension of the tube.

In an exemplary embodiment, the plant protector according to the invention can be characterized in that the wall of the tube comprises exclusively flat or exclusively curved wall parts.

In an exemplary embodiment, the plant protector according to the invention can be characterized in that the wall of the tube comprises at least three flat wall parts and is essentially shaped like the jacket of a prism, in particular a three- or four-sided prism.

In an exemplary embodiment, the plant protector according to the invention can be characterized in that the wall of the tube comprises at least two curved wall parts.

In an exemplary embodiment, the plant protector according to the invention can be characterized in that the wall of the tube comprises flat wall parts and curved wall parts.

In an exemplary embodiment, the plant protector according to the invention can be characterized in that wall parts are glued to one another on edges that run parallel to the longitudinal extension of the tube and are adjoining or are connected to one another using adhesive strips, in particular made of paper, using textile tapes fastened to the wall parts, using seams, or using metal clips.

In an exemplary embodiment, the plant protector according to the invention can be characterized in that wall parts are connected to one another using at least one plug-in connection on at least one edge that runs parallel to the longitudinal extension of the tube and is adjoining.

In an exemplary embodiment, the plant protector according to the invention can be characterized in that wall parts are connected to one another using the plug-in connection on two edges that run parallel to the longitudinal extension of the tube and are adjoining and are connected to one another using adhesive strips, textile tapes, seams, or using metal clips on the other adjoining edges.

In an exemplary embodiment, the plant protector according to the invention can be characterized in that the wall parts are connected to one another using plug-in connections on all edges that run parallel to the longitudinal extension of the tube and are adjoining.

In an exemplary embodiment, the plant protector according to the invention can be characterized in that the wall parts are glued to one another on all edges that run parallel to the longitudinal extension of the tube and are adjoining or are connected to one another using adhesive strips, in particular made of paper, using textile tapes fastened to the wall parts, using seams, or using metal clips.

In an exemplary embodiment, the plant protector according to the invention can be characterized in that a rod holding device is provided on the inside of the plant protector.

In an exemplary embodiment, the plant protector according to the invention can be characterized in that the rod holding device comprises a space that is bounded toward the inside space of the plant protector by a strip that is secured on the plant protector.

In an exemplary embodiment, the plant protector according to the invention can be characterized in that the space of the rod holding device is bounded toward the outside by wall parts of the plant protector.

In an exemplary embodiment, the plant protector according to the invention can be characterized in that the strip engages through holes that are provided in the wall parts.

In an exemplary embodiment, the plant protector according to the invention can be characterized in that the strip has two slots that are open on one side and in that the ends of the holes are accommodated in the slots.

In an exemplary embodiment, the plant protector according to the invention can be characterized in that the wall parts are biodegradable.

In an exemplary embodiment, the plant protector according to the invention can be characterized in that the wall parts, the small locking plates, and/or the strips consist of plant fibers that are pressed with or without added binding agents, in particular wood fibers and/or wood shavings that are pressed without binding agents.

In an exemplary embodiment, the plant protector according to the invention can be characterized in that the plug-in connection comprises a tongue and a slot and in that the position of the tongue inserted through the slot is maintained by a safety device.

In an exemplary embodiment, the plant protector according to the invention can be characterized in that the safety device is a small locking plate, which is inserted through a slot-like opening in the tongue.

In an exemplary embodiment, the plant protector according to the invention can be characterized in that the small locking plate has one recess each on its edges lying in the area of the ends of the opening.

In an exemplary embodiment, the plant protector according to the invention can be characterized in that the small locking plate is essentially trapezoidal.

In an exemplary embodiment, the plant protector according to the invention can be characterized in that wedge-shaped grooves that lie in the surface forming the inside of the plant protector are provided between wall parts.

In an exemplary embodiment, the plant protector according to the invention can be characterized in that the plug-in connection comprises safety washers.

In an exemplary embodiment, the plant protector according to the invention can be characterized in that the safety washers have an indentation and a projection that is diametrically opposite to the latter.

In an exemplary embodiment, the plant protector according to the invention can be characterized in that the safety washers have another projection as a handle for twisting.

BRIEF DESCRIPTION OF THE DRAWINGS

Additional details, features, and advantages of the plant protector according to the invention are given in the description of embodiments below. Here.

DETAILED DESCRIPTION

Figure 1:
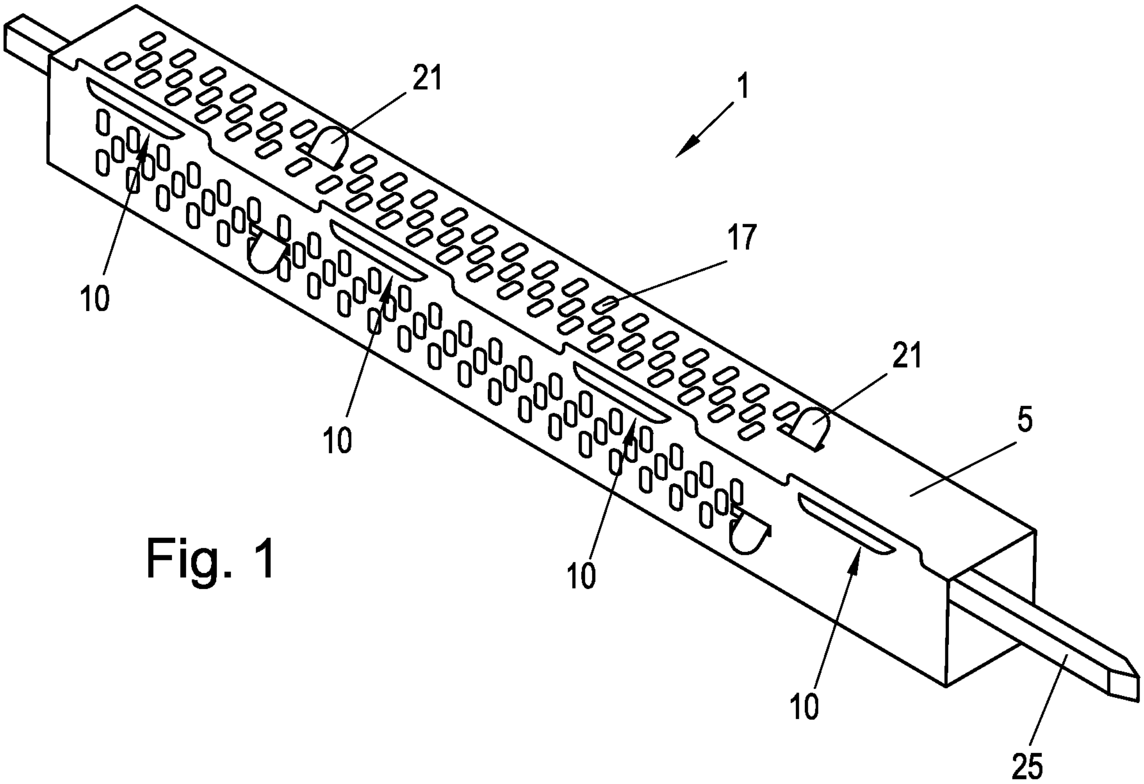
FIG. 1 shows in an oblique view a plant protector in the form of a four-sided prism with a plug.
Figure 5:
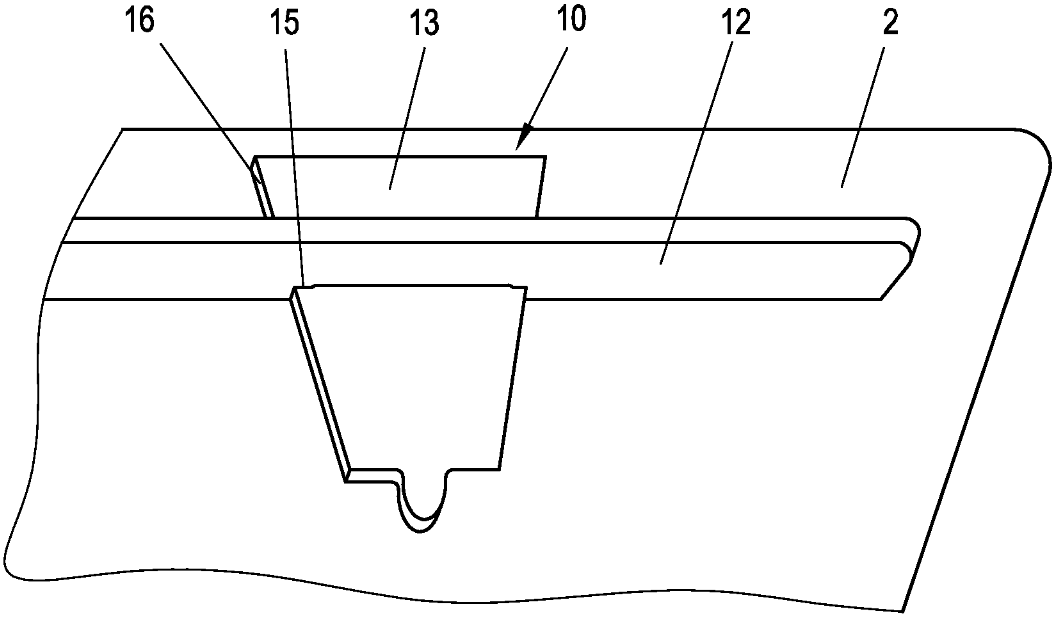
FIG. 5 shows a detail of the plant protector of FIG. 1.
Figure 2:
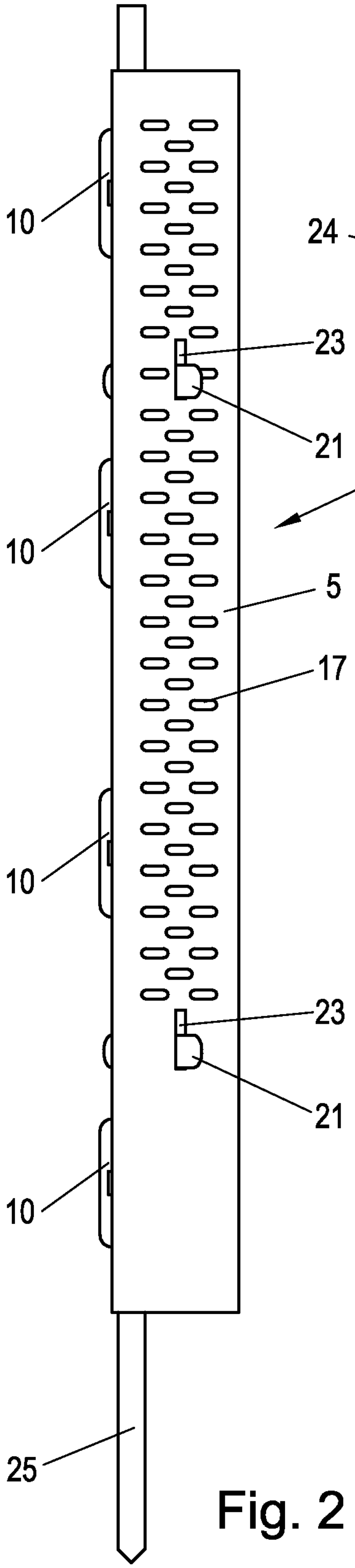
FIG. 2 shows in a side view the plant protector of FIG. 1.
Figure 6:
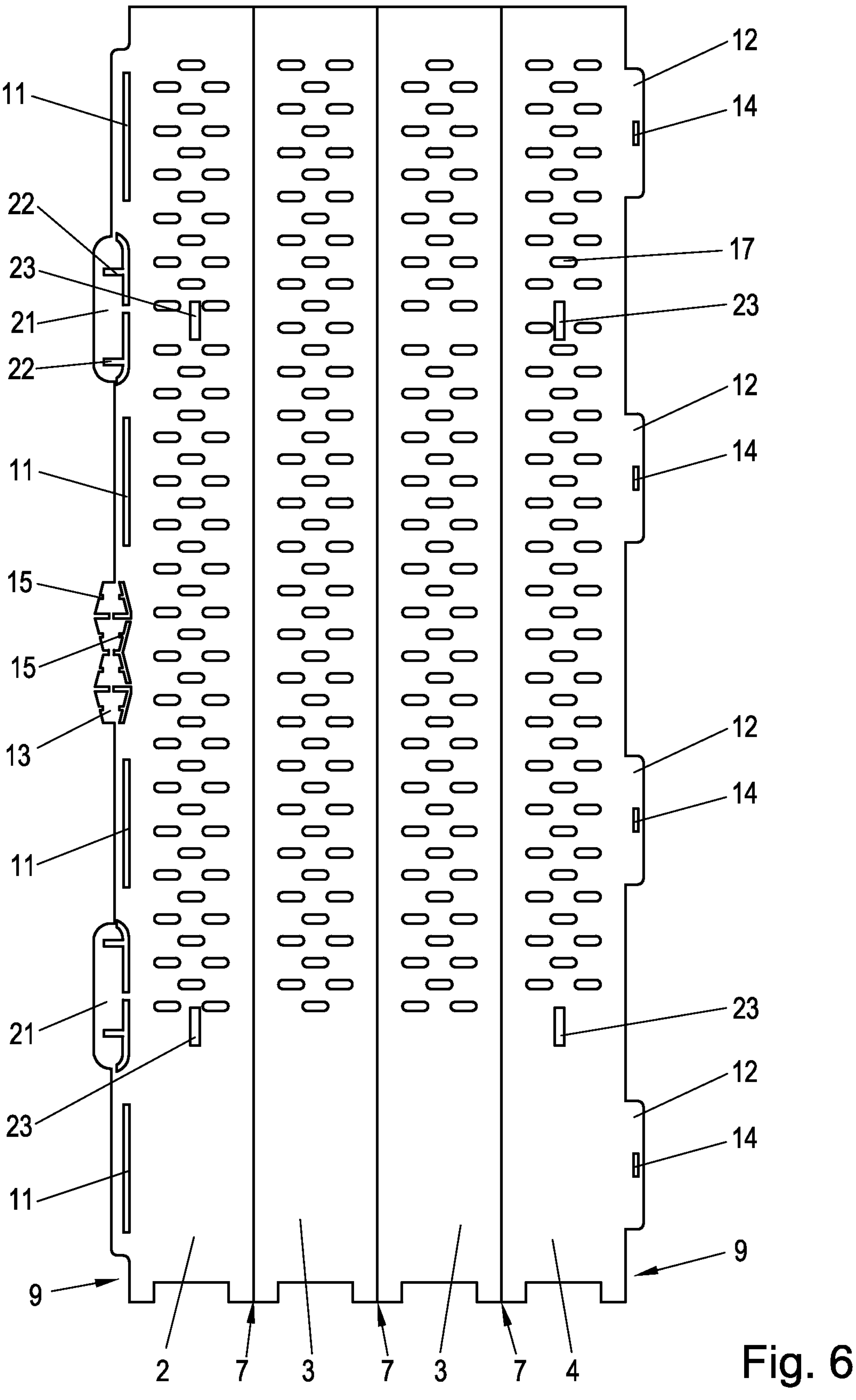
FIG. 6 shows a plate with the components of the plant protector of FIG. 1.
Figure 7:
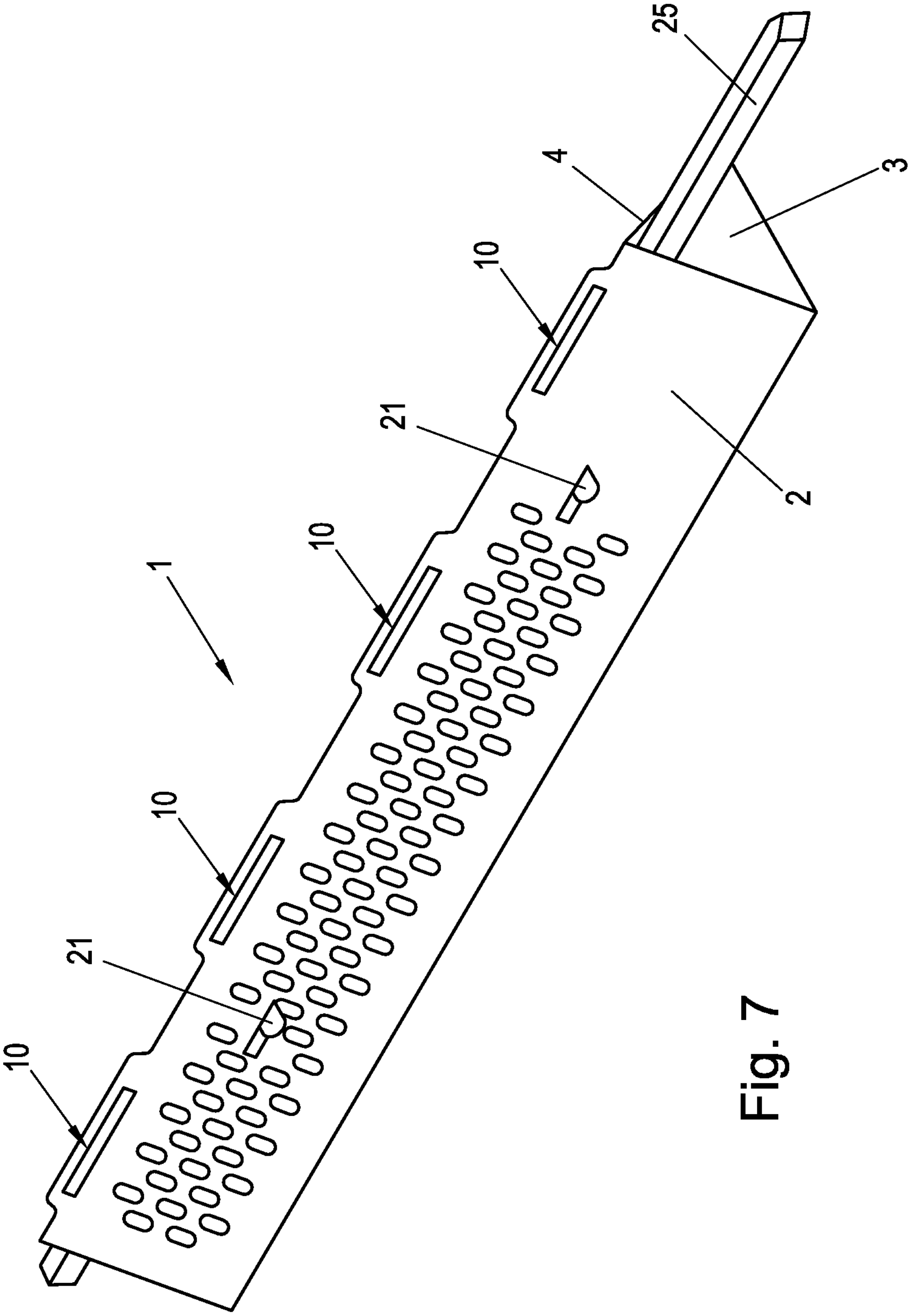
FIG. 7 shows in an oblique view a plant protector in the form of a three-sided prism with a plug.
Figure 10:
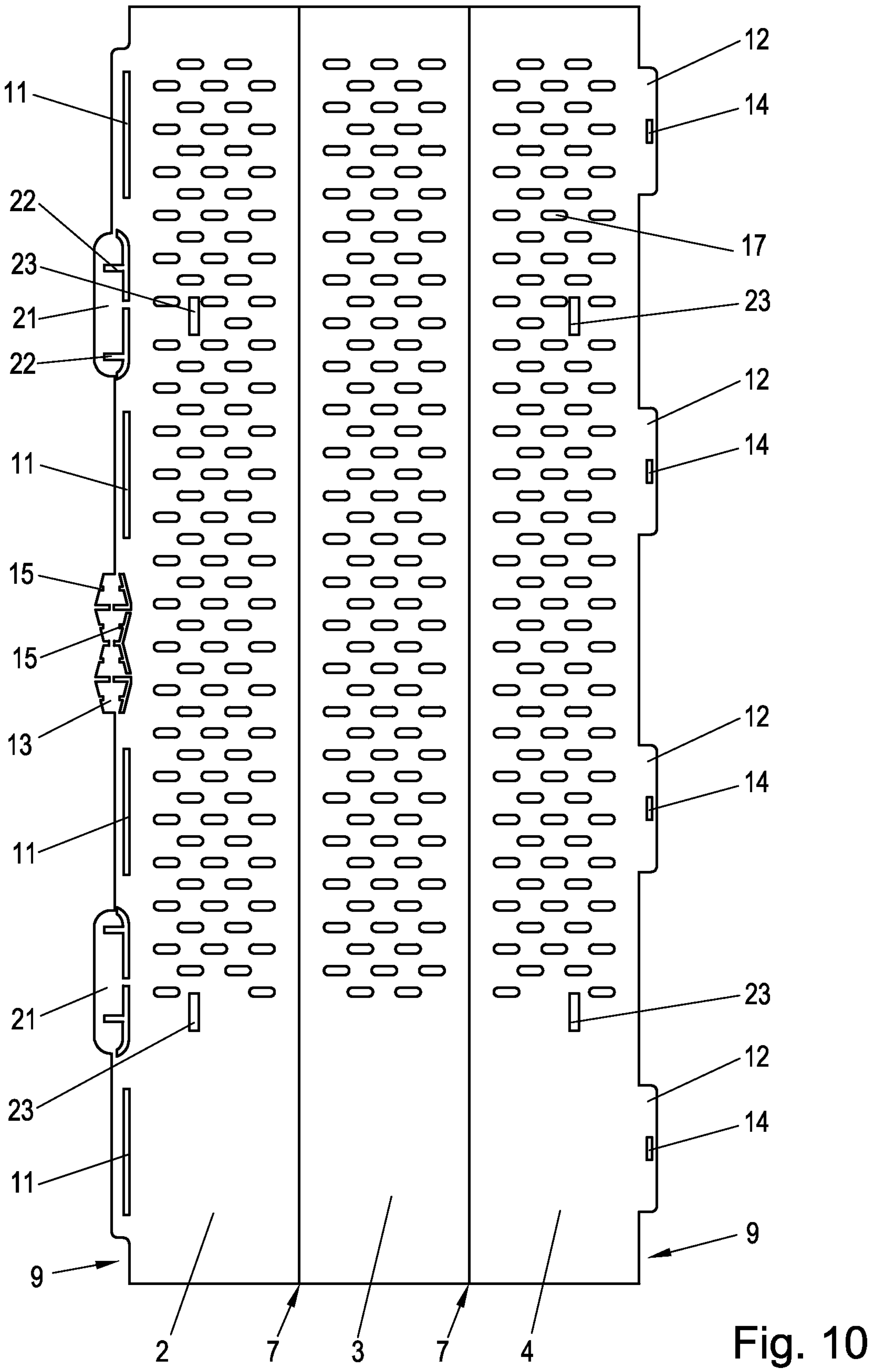
FIG. 10 shows a plate with the components of the plant protector of FIG. 7.

A plant protector 1 that is shown in FIGS. 1 to 5 has the form of a tube 5 shaped like a four-sided prism and comprises a terminal wall part 2, shown in FIG. 6, two central wall parts 3, and another terminal wall part 4.

The wall parts 2 to 4 of the plant protector 1 according to the invention are essentially rectangular and can be flat or curved.

The wall parts 2 to 4 are connected to one another along the adjoining edges (characterized in FIG. 6 by the arrow 7), so that it is possible to bend the wall parts 2 to 4, connected to one another, to form a tube 5 (FIG. 1) shaped like the jacket of a four-sided prism. The connection can be made using adhesive strips 8 (FIG. 4), e.g., made of paper, using textile tapes 30 (FIGS. 11 and 12), seams (FIG. 13), or using metal clips, such as steel clips.

When textile tapes 30, such as tissue tapes or felt tapes, are used, consideration is given within the framework of the invention to fastening the tissue tape to the edge areas of adjoining, plate-like wall parts 2 to 4. The fastening of the textile tapes 30 can be carried out by gluing, attaching, and/or stapling.

When adjoining wall parts 2 to 4 are connected to one another by seams 32, consideration is given to using the threads (yarn) forming the seams 32, so that the threads extend into the edge areas of adjoining edges of the wall parts 2 to 4. In particular, the seams are zig-zag seams.

Openings 17 that in the embodiment are designed as slots oriented crosswise to the longitudinal extension of the plant protector 1 are provided in the wall parts 2 to 4. Other forms of openings 17 are also taken into consideration.

The terminal edges that are not connected to one another by adhesive strips 8 or other means, such as textile tapes, seams, metal clips, wire, rope, or cord, i.e., are initially free (characterized in FIG. 6 by arrow 9), are connected to one another by at least one plug-in connection 10, for example two, three, or four plug-in connections 10, so that a tube 5 (FIG. 1) is present.

Within the scope of the invention, consideration is given to the fact that also the initially free edges of the terminal, plate-like wall parts 2 and 4 are connected to one another using means (adhesive strips 8, textile tapes 30, seams, metal clips) that are also used for connecting the wall parts 2 to 4.

The plug-in connections 10 comprise slots 11 provided on one edge of the wall part 2 and tongues 12 provided on one edge of the wall part 4. In the closed position, the tongues 12 are inserted through the slots 11. In addition, small locking plates 13 are provided that are inserted into the tongues 12 to secure the plug-in connections 10 through slot-like openings 14. This is shown in FIG. 5. FIG. 5 shows in particular that the small locking plates 13 are somewhat trapezoidal and have recesses 15 (for example, notches) on their oblique edges 16. As FIG. 5 shows, the ends of the slot-like openings 14 lock into the recesses 15 on the oblique edges 16 of the small locking plates 13 when small locking plates 13 are correctly inserted. The small locking plates 13 thus ensure that the tongues 12 cannot slip out from the slots 11, a plug-in connection 10 is not accidentally opened, and the plant protector 1 is not dislodged, for example by wind, from its plant-protecting position.

In a possible embodiment, the plant protector 1 has a rod holding device 20 ("plug holding device"). The rod holding device 20 is formed by at least one strip 21. The strip 21 has (cf. FIG. 6) two slots 22 that are open on one side. The strip 21 is inserted through two slot-like holes 23, which are oriented parallel to the longitudinal extension of the plant protector 1 and then shifted so that the ends of the holes 23 are accommodated in the slots 22, open on one side, of the strip 21. The strips 21 are usually shifted in such a way that, with the plant protector 1 in its operating position, the lower ends of the holes 23 are accommodated in the slots 22 that are open on one side—in the downward-facing operating position.

Figure 3:
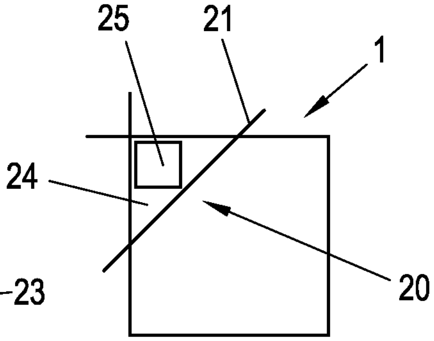
FIG. 3 shows in a top view the plant protector of FIG. 1.
Figure 9:
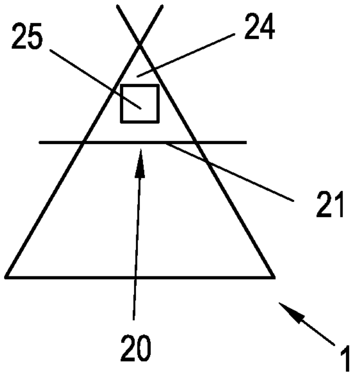
FIG. 9 shows in a top view the plant protector of FIG. 7.
Figure 8:
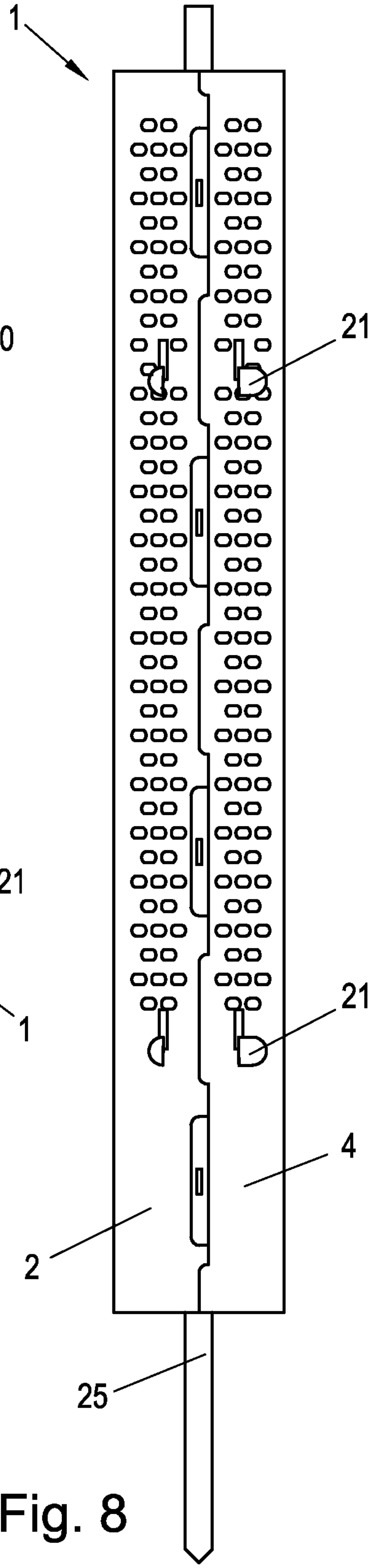
FIG. 8 shows in a side view the plant protector of FIG. 7.
Figure 4:
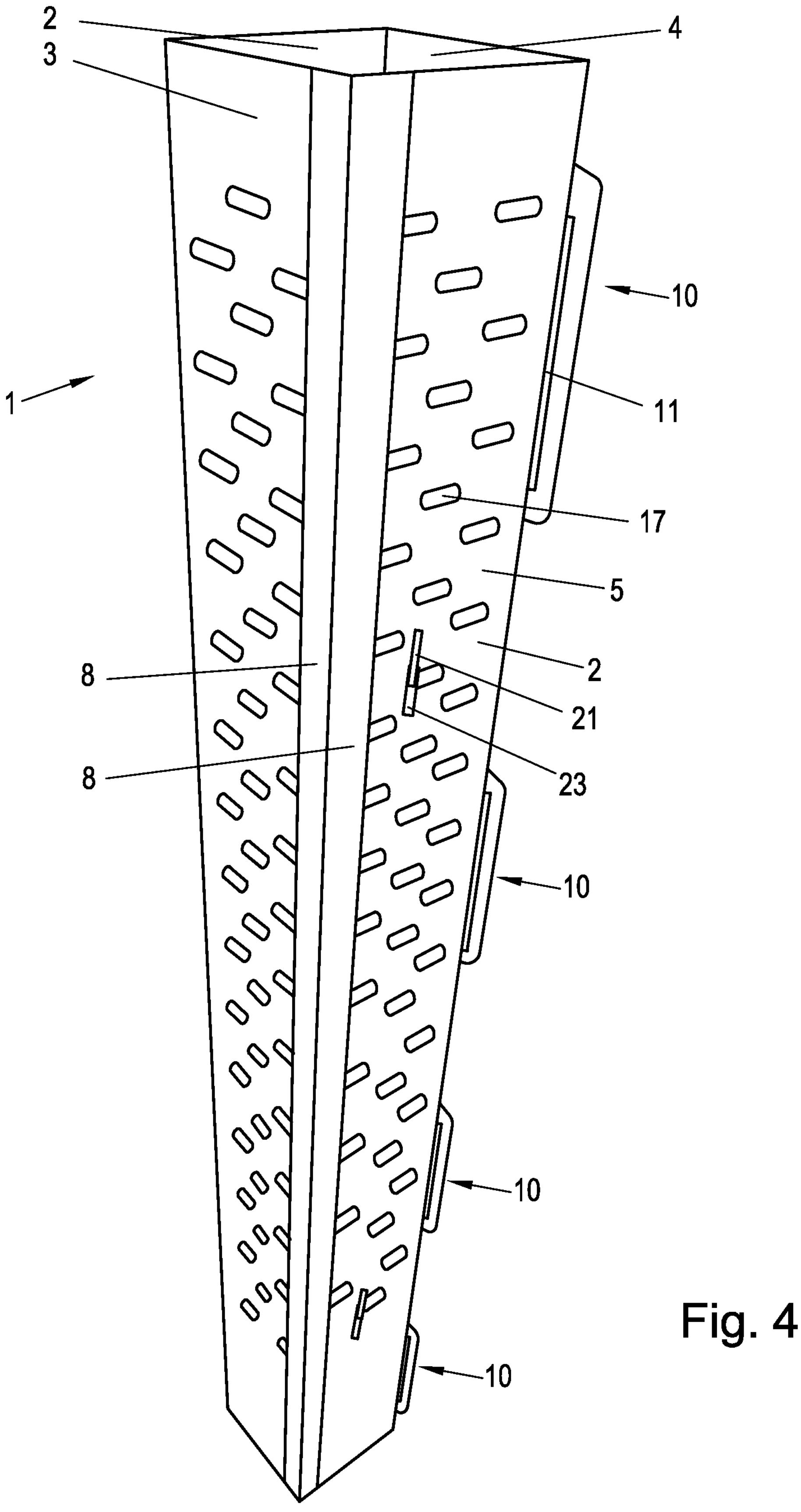
FIG. 4 shows in another oblique view the plant protector of FIG. 1 without a plug.

In the space 24 bounded by two wall parts 2 and 4 and by the strips 21 (FIG. 3 and FIG. 9), a rod 25 or a plug can be accommodated, as, for example, FIG. 3 (or FIG. 9) shows. The rod holding device 20 with the strips 21 also has the effect of stabilizing the form of the tube 5 of the plant protector 1 even when the latter is shaped like a jacket of a four- or multi-sided prism.

The strips 21 and the rod 25 can consist of the same material (pressed natural fibers) as the wall parts 2, 3, and 4.

FIG. 6 shows a plate with the components of the plant protector 1, namely the wall parts 2, 3, and 4, the small locking plates 13, and the strips 21. The above-mentioned components of the plant protector 1 are still connected to one another by, for example punched, scoring lines. The components of the plant protector 1 are separated from one another, then the wall parts 2, 3, and 4 along the edges characterized with the arrow 7 are connected to one another by adhesive strips 8, textile tapes 30, seams, or metal clips, deformed (bent) to form a prismatic tube 5, finally the plug-in connections 10 are closed, and the plug-in connection 10 is ultimately secured with the small locking plates 13.

The variant of a plant protector 1 with a tube 5 shaped like the jacket of a three-sided prism, shown in FIGS. 7 to 10, comprises a terminal wall part 2, a central wall part 3, and a terminal wall part 4.

Moreover, the plant protector 1 of the embodiment, shown in FIGS. 7 to 10, including the plug-in connections 10 and the strip 21 forming a rod holding device 20, corresponds to the embodiment of the plant protector 1 described in connection with FIGS. 1 to 6.

The lower end of the plant protector 1 in the operating position can be designed with feet, as is known from AT 11 447 U1 or EP 2 324 699 A1 and indicated in FIG. 6.

Figure 11:
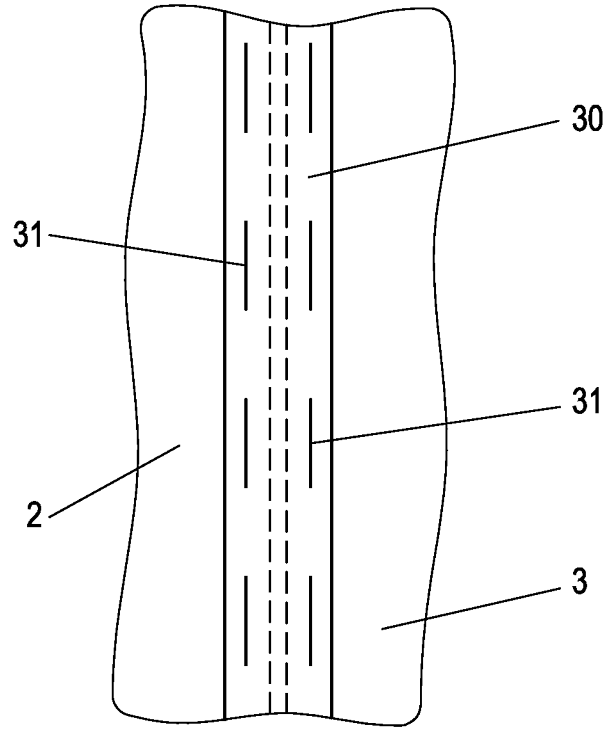
FIG. 11 shows a cutaway of two wall parts connected to one another by a textile tape.

FIG. 11 shows by way of example a connection of two adjoining wall parts 2 and 3 using a textile tape 30, which is fastened with staples 31 to the wall parts 2 and 3 in the area of their adjacent edges (depicted by solid lines in FIG. 11).

Figure 12:
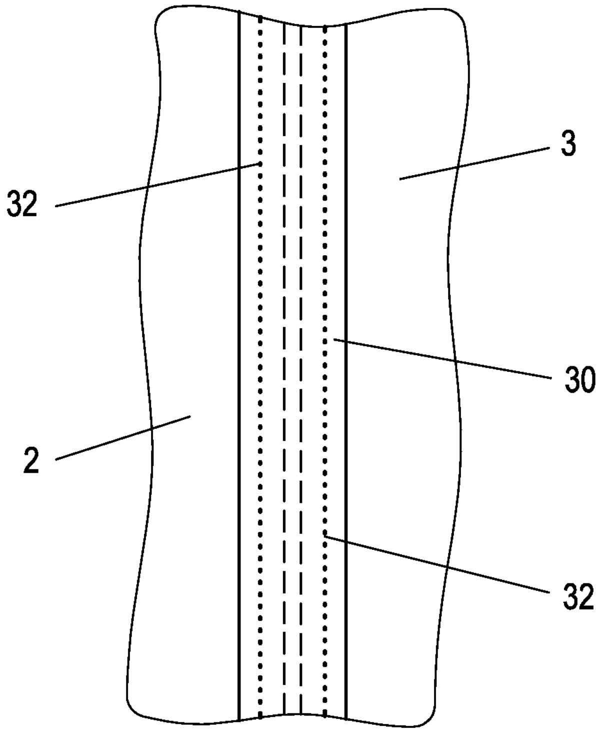
FIG. 12 shows a cutaway of two wall parts connected to one another by an attached textile tape.

FIG. 12 shows by way of example a connection of two adjoining wall parts 2 and 3 using a textile tape 30, which is fastened by seams 32 to the wall parts 2 and 3 in the area of the adjacent edges of the wall parts 2 and 3.

The embodiments of FIGS. 11 and 12 do not rule out that the textile tape 30 is fastened exclusively to the wall parts 2 and 3 (i.e., without a seam or staples) or else by gluing.

Figure 13:
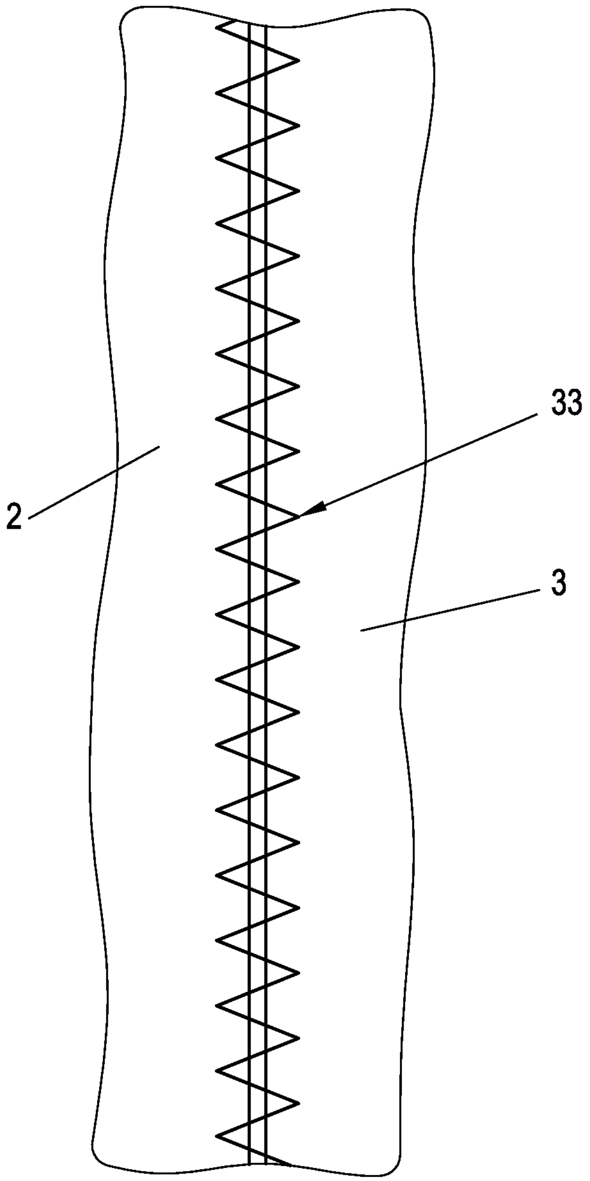
FIG. 13 shows a cutaway of two wall parts connected to one another by a seam.

FIG. 13 shows by way of example an embodiment in which two adjoining wall parts 2 and 3 are connected to one another by a seam, in the example a zigzag seam 33. Other forms of a seam can also be used.

In all embodiments of the plant protector 1 according to the invention, the inside of the tube 5 can be lined with a translucent (e.g., transparent) film and/or with a mesh. This embodiment of the plant protector 1 prevents the terminal shoot of the plant from growing out through the openings 17 in the tube 5. In addition, in particular in the case of a film, a greenhouse effect is created that promotes the growth of the plant.

When, as provided, for example, within the framework of the invention, the film and the mesh consist of a (biologically) degradable material, the mesh and the film deteriorate—after a certain length of time—and the advantages, namely aeration and improved root growth, of the plant protector 1 with openings 17 are again ensured.

Figure 14:
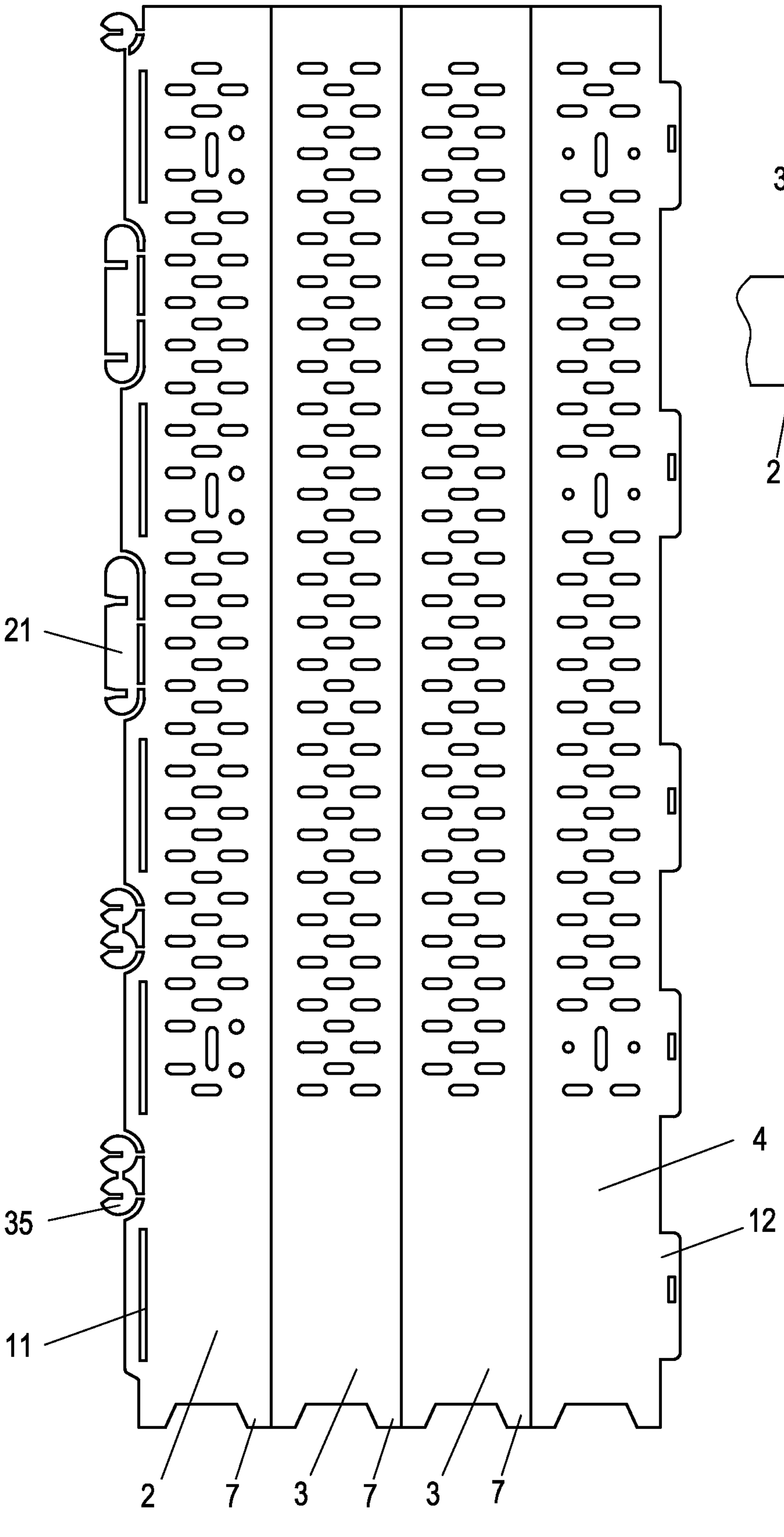
FIG. 14 shows an alternative embodiment of the plate with components of the plant protector.
Figure 16:
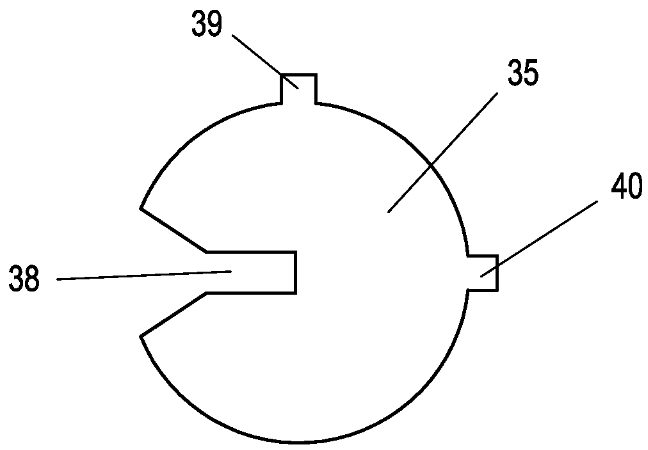
FIG. 16 shows an alternative embodiment of a small locking plate.

The embodiment, shown in FIG. 14, of a plate with the components of the plant protector 1 comprises the two terminal wall parts 2 and 4 and the two central wall parts 3. Furthermore, the strips 21 of the rod holding devices 20 are provided. Furthermore, on the outer edges of the terminal wall parts 2 and 4, the tongues 12 are provided with slot-like openings 14 and the slots 11 for the plug-in connections 10, which connect the free edges of the terminal wall parts 2 and 4 to one another. In order to secure the plug-in connections 10, safety washers 35 with an essentially circular shape are provided. The safety washers 35 are explained in more detail based on FIGS. 16 to 18.

Figure 15:
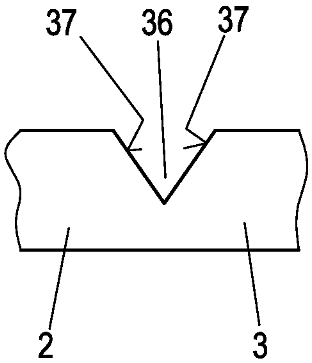
FIG. 15 shows in section a detail relative to FIG. 14.

In the embodiment shown in FIG. 14, the wall parts 2 to 4 are connected to one another. So that the plate can be bent in the area of the edges of the plant protector 1, grooves 36 that are wedge-shaped in cross-section (FIG. 15) are provided on the surface forming the inside of the plant protector 1. The opening angle between the lateral surfaces 37 of the grooves 36 can be on the order of magnitude of 50 to 70°, in particular 60°.

The grooves 36 can be produced by machining of the plate by cutting or by compressing the material of which the plate consists.

The formation of the edges with grooves 36 can be combined with other options to connect the wall parts 2 to 4 to one another.

The safety washers 35 are designed to be essentially circular with an indentation 38 and two projections 39, 40. The projections 39 and 40 are created when the safety washers 35 are separated (dismantled) from the plate, shown in FIG. 14, with the wall parts 2 to 4 and the strips 21. The projections 39 and 40 have the advantages explained below.

Figure 17:
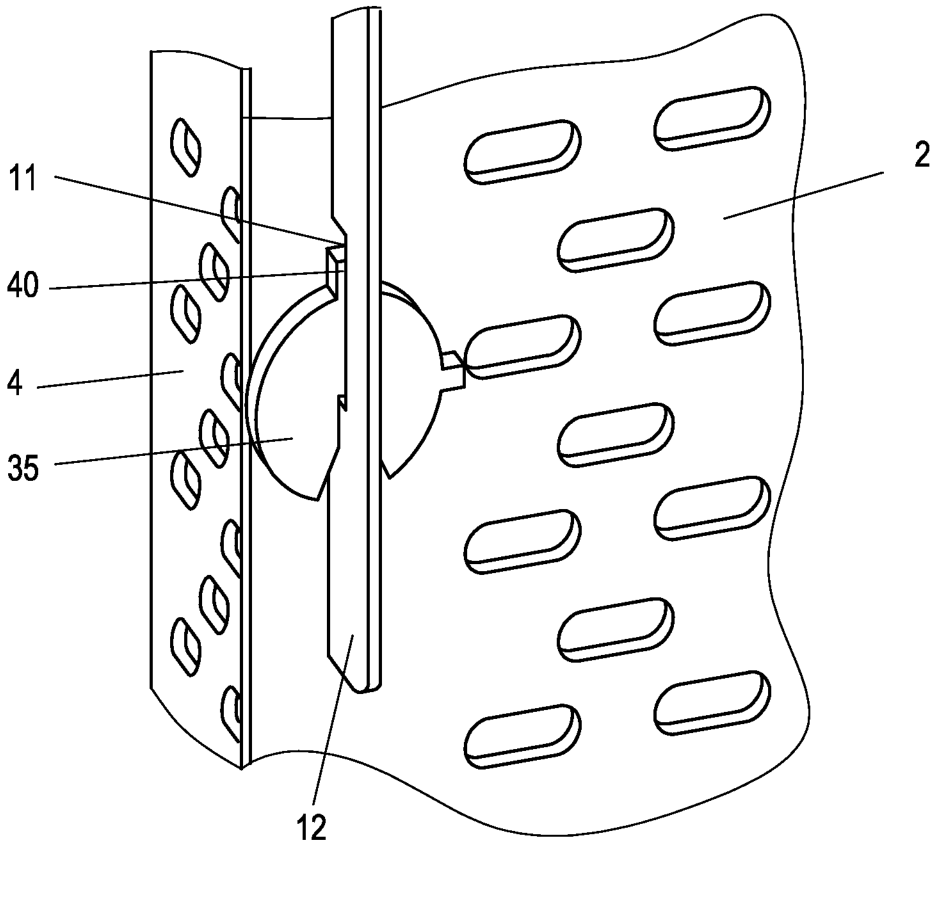
FIG. 17 shows an inserted small locking plate according to FIG. 16.
Figure 18:
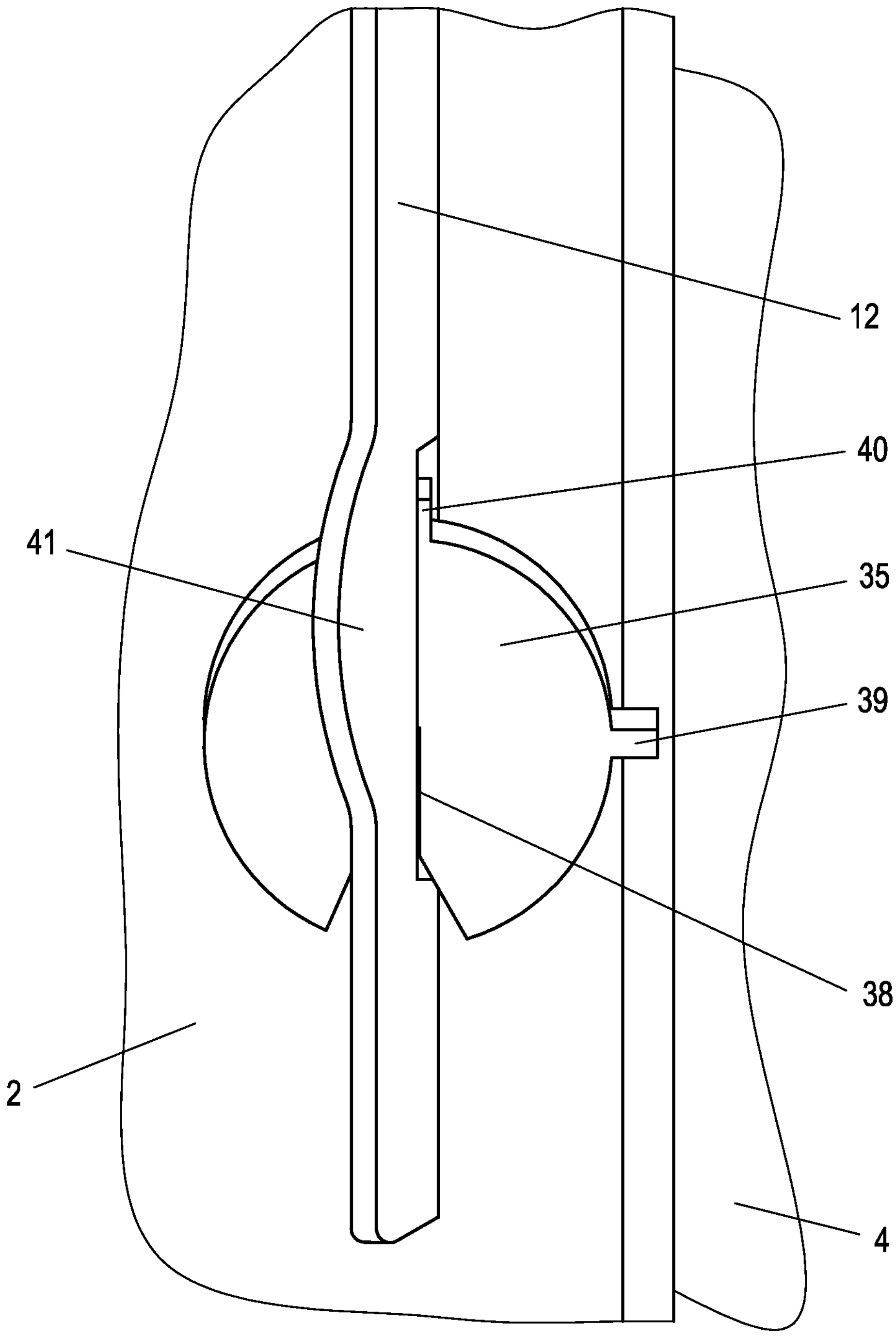
FIG. 18 shows the inserted small locking plate in another view.

The indentation 38 is widened on its open end. The one projection 40 is diametrically opposite to the indentation 38. The projection 40 secures the safety washer 35 in its active position, which is shown in FIGS. 17 and 18. The other projection 39 is used as a handle during insertion of the safety washers 35, when the safety washers 35 are twisted in their active position. In the active position, the safety washers 35 extend through the slot-like openings 14 into the tongues 12, wherein the indentation 38 sits astride one end of the slot-like openings 14.

A strap 41 can be provided on the free edge of the tongues 12 (FIG. 18).

In summary, an embodiment of the invention can be described as follows:

A plant protector 1 comprises four wall parts 2, 3, and 4, which are connected to one another to form a tube 5 shaped like the jacket of a prism. In this case, the wall parts 2, 3, and 4 are connected to one another up to one edge of the plant protector 1, so that the wall parts 2, 3, and 4 can pivot relative to one another in order to form the tube 5. The edges of the wall parts 2 and 4 initially not connected to one another and adjoining the other edge of the plant protector 1 are connected to one another using plug-in connections 10. The wall parts 2, 3, and 4, and the other components of the plant protector can consist of wood fibers and/or wood shavings that are pressed preferably without binding agents.

The invention claimed is:

1. A kit for assembling a plant protector in the form of a tube, the kit comprising:

a plurality of separate flat wall parts, each formed of a sheet; wherein the plurality of separate flat wall parts comprises:

one or more central separate flat wall parts each having a pair of free longitudinal edges; and two terminal separate flat wall parts, each having a terminal longitudinal edge and free longitudinal edge; wherein one of terminal longitudinal edges includes a plug-in connector and the other of the terminal longitudinal edges includes the corresponding plug-in structure;

a plurality of flexible connectors; wherein said flexible connectors selected from the group consisting of adhesive strips, textile tapes, and zigzag seams;

wherein the wall parts are configured to be connected to one another at a first set of free longitudinal edges by the flexible connectors and where in the flexible connectors are configured to bridge across the abutting free longitudinal edges such that the flexible connectors overlap portions of both adjacent wall parts on opposite sides of the abutting free longitudinal edges, to form an open sleeve, wherein the terminal longitudinal edges of the terminal wall parts are configured to be releasably secured to one another the plug-in connection to form the plant protector into a closed, tubular shape.

2. The kit for assembling a plant protector in the form of a tube according to claim 1, further comprising a rod holding device, wherein the rod holding device is configured to be provided on the inside of the plant protector.

3. The kit for assembling a plant protector in the form of a tube according to claim 2, further comprising a strip, wherein the rod holding device is configured to comprise a space that is bounded toward the inside space of the plant protector by the strip that is secured on the plant protector.

4. The kit for assembling a plant protector in the form of a tube according to claim 3, wherein the space of the rod holding device is configured to be bounded toward the outside by the wall parts of the plant protector.

5. The kit for assembling a plant protector in the form of a tube according to claim 3, wherein the strip is configured to engage through holes that are provided in the wall parts.

6. The kit for assembling a plant protector in the form of a tube according to claim 3, wherein the strip has two slots open on one side and wherein the ends of the holes are configured to be accommodated in the slots.

7. The kit for assembling a plant protector in the form of a tube according to claim 1, wherein the at least one plug-in connection comprises a tongue and a slot and wherein the position of the tongue inserted through the slot is maintained by a safety device.

8. The kit for assembling a plant protector in the form of a tube according to claim 1, wherein the wall parts are biodegradable.

9. The kit for assembling a plant protector in the form of a tube according to claim 1, further comprising small locking plates, and wherein the wall parts, the small locking plates, and/or the strips consist of plant fibers that are pressed with or without added binding agents.

10. The kit for assembling a plant protector in the form of a tube according to claim 1, further comprising wherein wedge-shaped grooves that lie in the surface forming the inside of the plant protector are provided between the one or more central wall parts.

11. The kit for assembling a plant protector in the form of a tube according to claim 1, wherein the at least one plug-in connection comprises safety washers.

12. The kit for assembling a plant protector in the form of a tube according to claim 11, wherein the safety washers have an indentation and a projection that is diametrically opposite to the indentation.

13. The kit for assembling a plant protector in the form of a tube according to claim 11, wherein the safety washers have another projection as a handle for twisting.

* * * * *